United States Patent [19]

Ziegler et al.

[11] Patent Number: 4,777,931
[45] Date of Patent: Oct. 18, 1988

[54] PLATEWARMER SYSTEM

[75] Inventors: Robert C. Ziegler, Lansdale; Pasquale D. Tropiano, Philadelphia, both of Pa.

[73] Assignee: Kaltron, Inc., Ambler, Pa.

[21] Appl. No.: 70,376

[22] Filed: Jul. 7, 1987

[51] Int. Cl.[4] .............................................. A47G 23/04
[52] U.S. Cl. .............................. 126/246; 220/DIG. 12
[58] Field of Search ....................... 126/246, 375, 390; 220/415, 75, DIG. 12, DIG. 14

[56] References Cited

U.S. PATENT DOCUMENTS

| 2,215,274 | 9/1940 | Peterson | 126/246 |
|---|---|---|---|
| 3,094,448 | 6/1963 | Cornelius . | |
| 3,557,774 | 1/1971 | Kreis | 126/246 |
| 3,734,077 | 5/1973 | Murdough et al. | 126/246 |
| 3,837,330 | 9/1974 | Lanigan et al. . | |
| 3,916,872 | 11/1975 | Kreis et al. | 126/246 X |
| 4,059,096 | 11/1977 | Schneider . | |
| 4,086,907 | 5/1978 | Rothschild | 126/246 |
| 4,235,282 | 11/1980 | Filippis et al. | 126/246 X |
| 4,530,344 | 7/1985 | Iyengar et al. . | |
| 4,567,877 | 2/1986 | Sepahpur . | |

Primary Examiner—Randall L. Green
Attorney, Agent, or Firm—Wigman & Cohen

[57] ABSTRACT

A platewarmer system comprises a platewarmer and platewarmer lid. The platewarmer has a base, a heat storage member supported on the base, and a retainer covering the heat storage member and fixed to the base whereby the heat storage member is fixed to the base. The platewarmer lid has a body and an insert fixed to the underside of the body for reflecting heat radiated from the surface over which the lid is placed. The method of manufacturing the platewarmer includes forming a heat storage member, forming a retainer, and molding a plastic base wherein the heat sotrage member and retainer are encapsulated in the base as a unit. The method of manufacturing the platewarmer lid includes forming an insert and molding a plastic base wherein the insert is encapsulated inside the base.

40 Claims, 3 Drawing Sheets

PLATEWARMER SYSTEM

BACKGROUND OF THE INVENTION

The present invention relates broadly to an improved platewarmer system, including a platewarmer and a lid, and a method of making same.

The platewarmer system of the present invention is effective in keeping food warm until served and eaten at a location remote from a food preparation center, as is commonly used in hospitals, nursing homes and hotels.

A search of the prior art failed to uncover any prior art references which disclose the platewarmer system of the present invention. A number of patents were uncovered which disclose various platewarmers and lids for platewarmers.

While conventional platewarmers offer certain advantages and disadvantages, none has the combination of desirable features of the present invention.

The following is a listing of the patents uncovered during the aforementioned search:

| Patent No. | Patentee | Date |
|---|---|---|
| 3,094,448 | Cornelius | June 18, 1963 |
| 3,557,774 | Kreis | January 26, 1971 |
| 3,734,077 | Murdough et al | May 22, 1973 |
| 3,837,330 | Lanigan et al | September 24, 1974 |
| 3,916,872 | Kreis et al | November 4, 1975 |
| 4,059,096 | Schneider | November 22, 1977 |
| 4,086,907 | Rothschild | May 2, 1978 |
| 4,530,344 | Iyengar et al | July 23, 1985 |
| 4,567,877 | Sepahpur | February 4, 1986 |

Kreis et al (U.S. Pat. No. 3,916,872) disclose a platewarmer with plastic sidewalls 14 surrounding an annular-shape or solid aluminum heat storage member 12. Member 12 is exposed to the atmosphere on both the upper surface 42 and the lower surface 20 thereby losing heat more rapidly than is necessary and permitting pitting of the member when washed with detergents and the like.

Iyengar et al disclose a heat radiating plastic lid 1 for directly covering a dinner plate and include a heat retaining member 24. Member 24 is totally enclosed with the inner and outer walls of lid 1. No platewarmer is provided.

Cornelius discloses an insulated plastic container for liquids wherein a reflective metallic coating 11 is provided on the inner surface of the outer shell 10 (col. 3, lines 44-47) to furnish, inter alia, "a reflective barrier to radiant heat exchange externally of the assembled unit" (col. 1, lines 43-49). No suggestion is made, however, for its use in a platewarmer construction.

The remaining patents are merely of general interest and show various platewarmers made of stainless steel or plastic and being of generally double wall construction.

SUMMARY AND OBJECTS OF THE INVENTION

In view of the foregoing limitations and shortcomings of the prior art devices, as well as other disadvantages not specifically mentioned above, a primary objective of this invention is to provide a platewarmer system which is economical to manufacture and which is sturdy and reliable in performance.

More particularly, it is an object of this invention to provide a platewarmer which is easy to handle while hot and yet retains its heat for a prolonged period of time.

It is another object of this invention to provide a platewarmer system which keeps food warm as it is transported from kitchen to a remotely located consumer.

Yet another object of this invention is to provide a platewarmer system which is attractive, easy to keep clean and enduring.

Briefly described, the aforementioned objects are accomplished according to the invention by providing a platewarmer of generally solid construction having a molded plastic base, a heat storage member supported on the central portion of the base, and a heat reflecting metallic retainer covering the heat storage member and fixed to the base whereby the heat storage member is axially and radially fixed on the base.

Further, the objects of the invention are accomplished by providing a platewarmer lid having a molded plastic body with a heat reflecting metallic insert fixed to the inside of the central portion of the lid whereby heat radiated from the surface over which the lid is placed is reflected back to the heat-radiating surface.

Additionally, the objects of the invention are accomplished by providing a platewarmer and platewarmer lid system combining the aforementioned platewarmer and platewarmer lid.

Finally, the aforementioned objects are accomplished according to the invention by providing a method of manufacturing a platewarmer and platewarmer lid in which the metallic components are first formed and then molded integrally with the plastic portions of the platewarmer and platewarmer lid, respectively. By such solid construction, entry of air, liquid and/or bacteria are minimized thereby resulting in a more sterile system than conventional platewarmers.

With the foregoing other objects, advantages and features that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
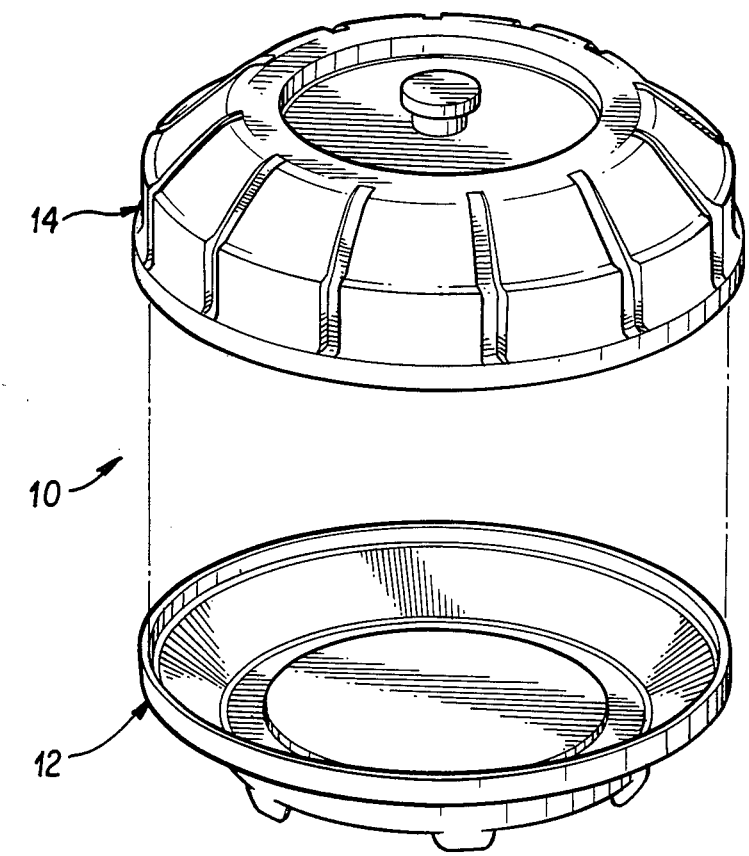
FIG. 1 is an isometric view of the platewarmer system in accordance with the invention.

Referring now in detail to the drawings wherein like parts are designated by like reference numerals throughout, there is illustrated in FIG. 1 a platewarmer system in accordance with the invention which is designated generally by reference numeral 10. Platewarmer system 10 comprises a platewarmer 12 and a platewarmer lid 14. As is apparent from FIG. 1, platewarmer 12 is shaped so as to receive a plate (not shown) carrying hot food, and is further configured so as to receive lid 14 to provide a chamber for retention of the heat by the food on the plate.

Figure 4:
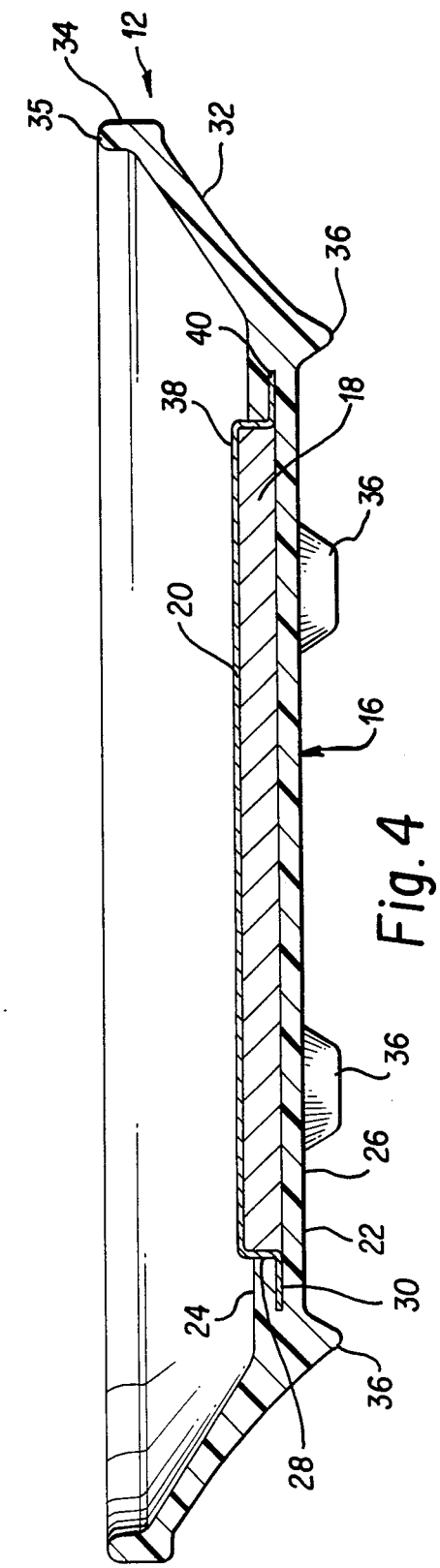
FIG. 4 is a cross-sectional view taken along line IV—IV of FIG. 5 showing the platewarmer in accordance with the invention.
Figure 5:
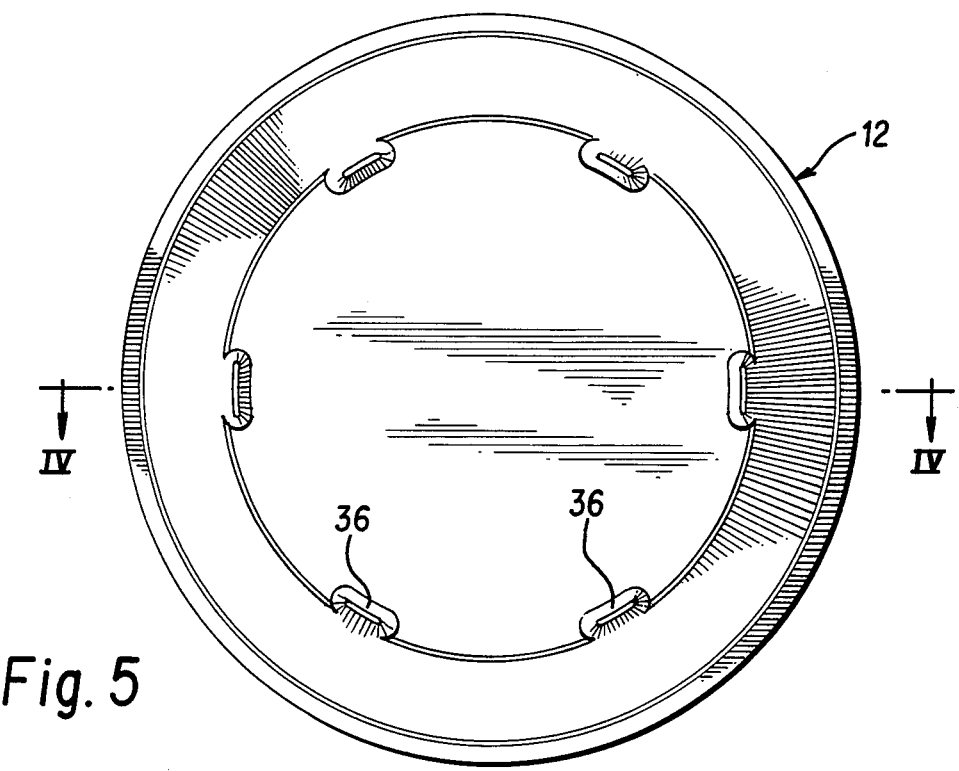
FIG. 5 is a bottom view of the platewarmer in accordance with the invention.

With reference to FIGS. 4 and 5, the platewarmer of the invention will now be described in greater detail.

Platewarmer 12 comprises a base 16, a heat storage member 18, and a retainer 20. Base 16 is a one-piece molded plastic unit having a flat, central portion 22. Central portion 22 has an upper surface 24 and a lower surface 26. Upper surface 24 is provided with a recess 28 for the receipt of heat storage member 18. The height of recess 28 is preferably less than the thickness of the heat storage member 18 which allows the heat storage member to project upwardly for a predetermined amount. In this way the bottom of a plate will rest against the heat storage member 18 and receive the maximum heat therefrom. Central portion 22 of base 16 is further provided with a circumferential groove or slot 30 extending radially outward of recess 28 for securing retainer 20.

Base 16 is provided with an upwardly-extending, angularly-inclined side wall 32. Side wall 32 terminates in a circumferential vertical ledge 34 having a rounded lip 35 for receiving the lid 14. Base 16 is further provided with a plurality of feet 36 projecting downwardly from the lower surface 26 of central portion 22 of the base. The base may be fabricated from any suitable plastic material capable of withstanding elevated temperatures, e.g., on the order of 250° F. to 350° F., and repeated cycling and washing. Exemplary of suitable plastics are polycarbonates, polypropylene and polysulfones, used alone, in blends or fiber reinforced. Polysulfones are preferred, especially modified polysulfones commercially available from Amoco Performance Products, Inc. (Ridgefield, CT). For example, Amoco's UDEL® and MINDEL® polysulfones may be advantageously employed, the MINDEL S-1000® being especially preferred due to its higher temperature stability characteristics. Suitable and known coloring agents are optionally added to the polymer to create any desired shade in color.

Heat storage member 18 is a generally flat, disc-shaped member having suitable heat-storing characteristics. Aluminum (or alloys thereof) heat storage discs have been known in the art and do not constitute, per se, a part of the present invention.

Retainer 20 overlaps heat storage member 18 and secures it to base 16. Retainer 20 is preferably a hat-shaped stainless steel thin sheet or foil. As shown in FIG. 4, retainer 20 has a central flat portion 38 which cooperates with heat storage member 18, and a radially extending flange 40 which extends into the groove 30 of base 16. In this manner the heat storage member 18 is secured onto the base 16.

The preferred method of manufacturing platewarmer 12 is as follows. First, heat storage member 18 and retainer 20 are formed, e.g., stamped, into the shapes shown in FIG. 4. Heat storage member 18 and retainer 20 are then fitted together and placed in a suitable mold as an insert. Plastic material is then injected into the mold to form base 16, encapsulating the insert into the base. The finished product is then released from the mold.

Figure 2:
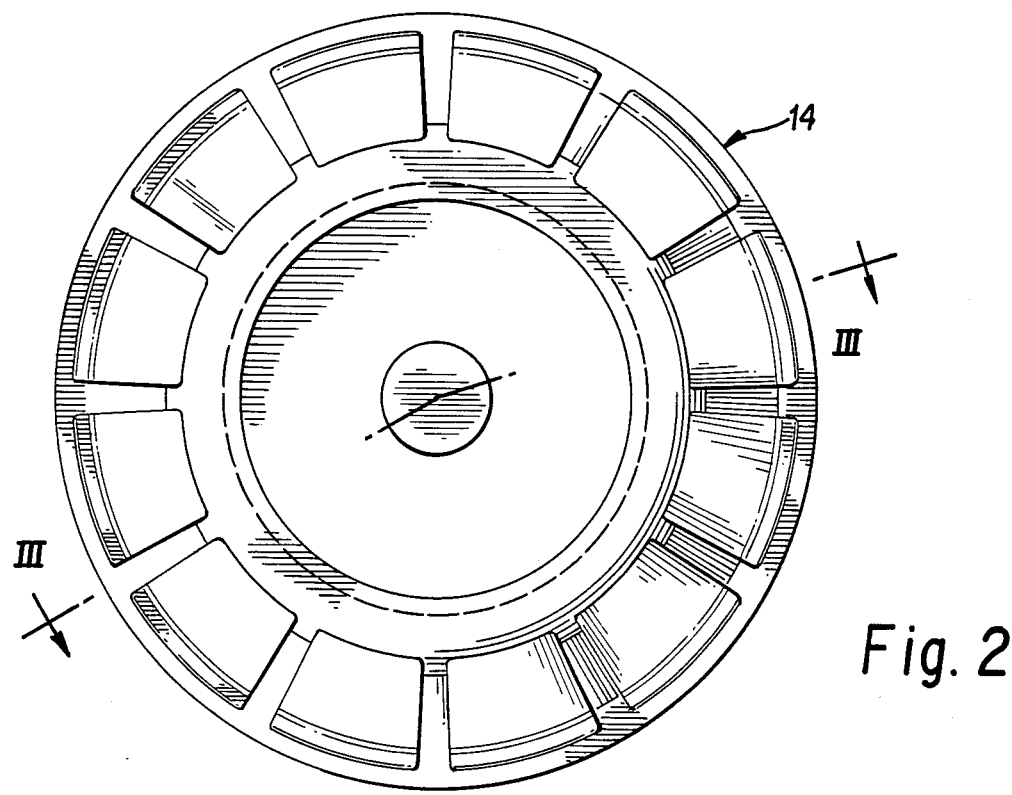
FIG. 2 is a top view of the platewarmer lid in accordance with the invention.
Figure 3:
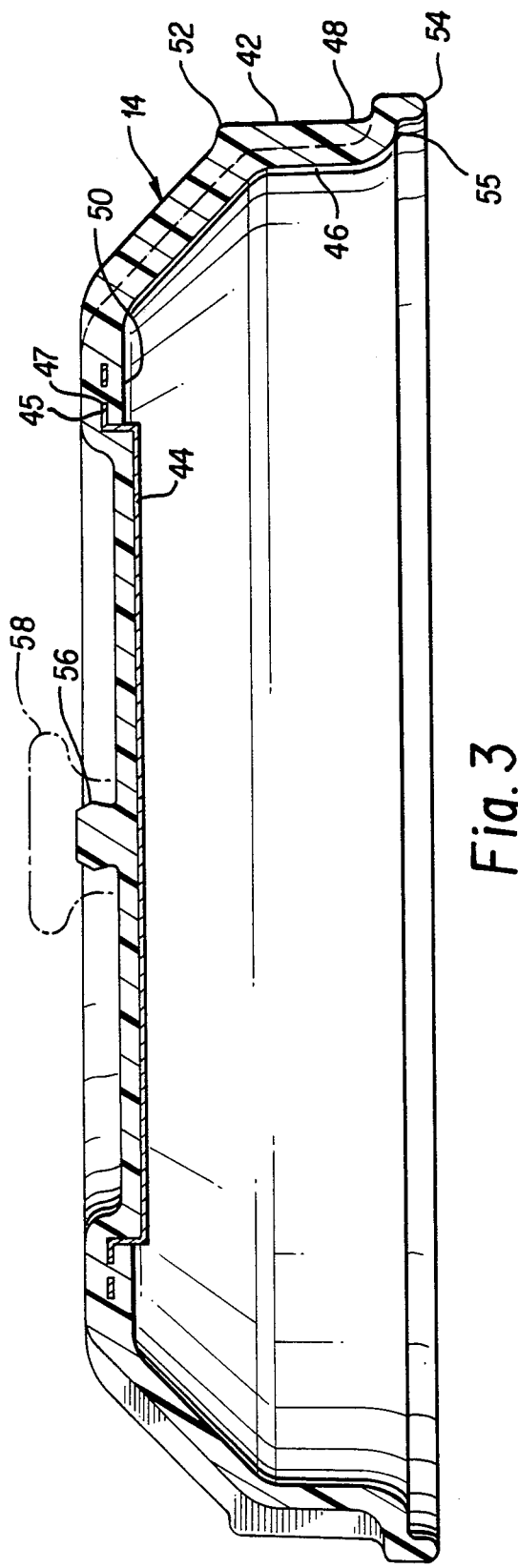
FIG. 3 is a cross-section, taken along line III—III of FIG. 2, showing the platewarmer lid in accordance with the invention.

Referring now to FIGS. 2 and 3 the platewarmer lid 14 of the present invention will be described.

Platewarmer lid 14 comprises a molded plastic body 42 and an internal heat reflecting metallic insert 44.

Molded plastic body 42 has an inside surface 46 and an outside surface 48. Inside surface 46 has a flat central portion 50 for receipt of and cooperation with metallic insert 44. As with the base 16, molded plastic body 42 may be formed of any suitable plastic material, such as polypropylene, polycarbonate, polyamide, polyethylene, or polysulfone. The preferred polymer is the MINDEL S-1000® polysulfone. Metallic insert 44 may be fabricated from any suitable material, but is preferably a thin foil of stainless steel having a highly polished, reflective surface.

Plastic body 42 of lid 14 further includes a circumferential, downwardly extending side wall 52. Side wall 52 terminates in its downward extension at ledge 54 which is designed to overlay ledge 34 of base 16 of platewarmer 12 when in use. At that time lip 35 of platewarmer 12 is in contact with shoulder 55 of platewarmer lid 14 to form a closed chamber therebetween. Furthermore, the reflective surface of insert 44 is so disposed and positioned within lid 14 as to reflect heat which is radiated from the surface which it faces. When a plate of hot food is placed within a preheated platewarmer 12 the combination of the closed chamber and the reflection of heat by insert 44 and retainer 20 cooperate to retain the heat within the platewarmer system and serve to keep the food hot until it is served and eaten. The platewarmer 12 and platewarmer lid 14 combination thus form a platewarmer system which operates in an efficient, effective, and economical manner which has not been heretofore known in the art. In contrast to conventional platewarmer systems which employ metallic shells, the present platewarmer system is of an insulating plastic which further enables the heat to be retained within the closed cavity.

The method of manufacturing the platewarmer lid is as follows. Insert 44 is formed from a stainless steel sheet or foil into the hat-like shape shown in FIG. 3. The insert is placed within a mold and suitable plastic material is injected into the mold to incorporate insert 44 into the body 42 of lid 14. The flange 45 of insert 44 becomes fully embedded in the lid 14 to permanently secure the insert. Holes 47 may be optionally provided in the insert to further secure the retainer. Although not shown, spaced holes may also be provided in the retainer flange 40 for additional securement.

A knob 56 is integrally formed on the outside surface 48 of body 42 during the molding of lid 14. After the unitary product, incorporating insert 44 and body 42 is released from the mold, a handle 58 is fitted over knob 56. In the preferred embodiment handle 58 is snap-fit over knob 56. The finished platewarmer lid 14 is thus formed.

Figure 6:
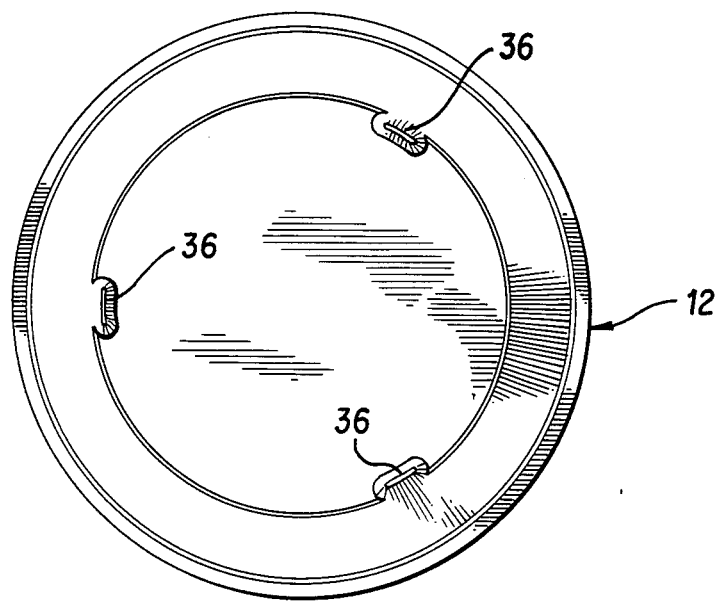
FIG. 6 is a bottom view of an alternative embodiment of a platewarmer in accordance with the invention.

Referring now to FIG. 6, with further reference to FIG. 5, an alternative embodiment of the platewarmer in accordance with the invention is illustrated. As is apparent from FIG. 6, platewarmer 12 is provided with three feet 36 while in the embodiment of FIG. 5, platewarmer 12 is provided with six feet 36.

From the foregoing it will be apparent that the platewarmer system of the present invention represents a dramatic improvement over conventional systems. For example, the use of thermally resistant plastic permits easier handling of the hot platewarmer. Attractive colors and patterns can be incorpoated in the platewarmer and/or lid. Finally, the use of internally positioned heat reflective surfaces in both the lid and the platewarmer, coupled with providing insulating means for retaining the heat within the system yields an improved heat retention system.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A platewarmer comprising:
   a plastic base having a flat, central portion;
   a heat storage member supported on the central portion of said base; and
   a metallic retainer covering said heat storage member and fixed to said base whereby said heat storage member is fixed on said base;
   wherein the upper surface of the central portion of the plastic base is recessed for receipt of said heat storage member; and
   wherein the central portion of the base includes a circumferential groove extending radially into said recess and said retainer is provided with a flange which cooperates with said groove for retention of said retainer on said base.

2. The platewarmer of claim 1 including an upwardly extending, outwardly inclined side wall which terminates at a rounded ledge for receiving a mating lid.

3. The platewarmer of claim 1, wherein the depth of the recess is less than the thickness of said heat storage member to permit the heat storage member to project beyond the inner surface of said platewarmer.

4. The platewarmer of claim 3 wherein the lower surface of the central portion of the base is provided with a plurality of downwardly projecting feet.

5. The platewarmer of claim 2 wherein said plastic base is a polysulfone.

6. The platewarmer of claim 3 wherein said plastic base is a polysulfone.

7. The platewarmer of claim 2 wherein said heat storage member is aluminum and said metallic retainer is stainless steel.

8. The platewarmer of claim 3 wherein said heat storage member is aluminum and said metallic retainer is stainless steel.

9. The platewarmer of claim 2 wherein said metallic retainer and heat storage member are integrally joined to said plastic base.

10. The platewarmer of claim 3 wherein said metallic retainer and heat storage are integrally joined to said plastic base.

11. The platewarmer of claim 9 wherein said metallic retainer and heat storage member are joined to the plastic base by injection molding.

12. The platewarmer of claim 3 wherein said retainer is hat-shaped and includes a flat central portion which terminates at a downwardly extending wall, which, in turn merges with an outwardly extending flange, said flange being encapsulated within said central portion of said base.

13. A platewarmer system comprising:
    a platewarmer having a plastic base, a heat storage member supported on said base, a metallic retainer having a flange, said retainer covering said heat storage member with said flange being molded into said base to fix said heat storage member to said base; and
    a lid which cooperates with said platewarmer including an insert fixed to the underside of said lid for reflecting heat radiated from the surface over which said lid is placed.

14. The platewarmer system of claim 13 wherein said heat storage member is fixed in heat conducting relationship with said metallic retainer.

15. The platewarmer system of claim 13 wherein
    said platewarmer base has a flat, central portion;
    said retainer is of hat-shaped construction which fixes said heat storage member axially and radially on said base.

16. The platewarmer system of claim 15 wherein the upper surface of the central portion of the plastic base is provided with a central recess for receiving said heat storage member, the depth of said recess being less than the thickness of said heat storage member to permit the heat storage member to protrude upwardly from said plastic base.

17. The platewarmer system of claim 16 wherein said plastic base is a polysulfone.

18. The platewarmer system of claim 16 wherein said heat storage member is aluminum and said retainer is stainless steel.

19. The platewarmer system of claim 17 wherein said plastic base is injection molded.

20. The platewarmer system of claim 15 wherein
    said lid is molded from plastic and has an inside surface and an outside surface, the inside surface having a flat central portion; and
    said insert is metallic and is fixed to the inside surface of said central portion of the lid.

21. The platewarmer system of claim 20 wherein said insert is molded into said plastic body.

22. The platewarmer system of claim 21 wherein said plastic body is polysulfone.

23. The platewarmer system of claim 20 wherein said insert is stainless steel.

24. The platewarmer system of claim 22 wherein said insert is stainless steel.

25. A method of manufacturing a platewarmer comprising:
    forming a heat storage member;
    forming a retainer; and
    molding a plastic base wherein said heat storage member and retainer are encapsulated in said base as a unit.

26. A platewarmer comprising:
    a plastic base having a flat, central portion;
    a heat storage member supported on the central portion of said base; and
    a metallic retainer having a flange, said retainer covering said heat storage member, with said flange being molded into said base, whereby said heat storage member is fixed on said base.

27. The platewarmer of claim 26 wherein the upper surface of the central portion of the plastic base is recessed for receipt of said heat storage member.

28. The platewarmer of claim 27 wherein the central portion of the base includes a circumferential groove extending radially into said recess and said flange cooperates with said groove for retention of said retainer on said base.

29. The platewarmer of claim 26 including an upwardly extending, outwardly inclined side wall which terminates at a rounded ledge for receiving a mating lid.

30. The platewarmer of claim 27, wherein the depth of the recess is less than the thickness of said heat storage member to permit the heat storage member to project beyond the inner surface of said platewarmer.

31. The platewarmer of claim 30 wherein the lower surface of the central portion of the base is provided with a plurality of downwardly projecting feet.

32. The platewarmer of claim 29 wherein said plastic base is a polysulfone.

33. The platewarmer of claim 30 wherein said plastic base is a polysulfone.

34. The platewarmer of claim 29 wherein said heat storage member is aluminum and said metallic retainer is stainless steel.

35. The platewarmer of claim 30 wherein said heat storage member is aluminum and said metallic retainer is stainless steel.

36. The platewarmer of claim 29 wherein said metallic retainer and heat storage member are integrally joined to said plastic base.

37. The platewarmer of claim 30 wherein said metallic retainer and heat storage member are integrally joined to said plastic base.

38. The platewarmer of claim 36 wherein said metallic retainer and heat storage member are joined to the plastic base by injection molding.

39. The platewarmer of claim 26 wherein said retainer is hat-shaped.

40. The platewarmer of claim 26 wherein said heat storage member is fixed in heat conducting relationship with said metallic retainer.

* * * * *

UNITED STATES PATENT AND TRADEMARK OFFICE
CERTIFICATE OF CORRECTION

PATENT NO. : 4,777,931
DATED : October 18, 1988
INVENTOR(S) : ROBERT C. ZIEGLER ET AL It is certified that error appears in the above-identified patent and that said Letters Patent is hereby corrected as shown below:

IN THE ABSTRACT:

Line 5 from the bottom, "sotrage" should be --storage--.

IN THE CLAIMS:

Claim 10, column 5, line 51, after "storage" insert

--member--.

Signed and Sealed this

Fourteenth Day of March, 1989

Attest:

DONALD J. QUIGG

*Attesting Officer*  *Commissioner of Patents and Trademarks*